(12) United States Patent
Campbell et al.

(10) Patent No.: US 6,504,622 B1
(45) Date of Patent: Jan. 7, 2003

(54) FREEING MEMORY IN A PAGE PRINTER DURING PUNT PROTECTION

(75) Inventors: Russell Campbell, Boise, ID (US); Timothy P. Blair, Boise, ID (US); Richard M. Dow, Laramie, WY (US); Douglas J. Mellor, Meridian, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/666,161

(22) Filed: Sep. 20, 2000

Related U.S. Application Data

(63) Continuation of application No. 09/064,890, filed on Apr. 22, 1998, now Pat. No. 6,166,827.

(51) Int. Cl.$^7$ .............................................. G06F 15/00
(52) U.S. Cl. ...................... 358/1.17; 358/1.14; 358/1.16
(58) Field of Search ............................... 358/1.15, 1.16, 358/1.17, 1.18, 1.13, 1.12, 1.11, 1.5, 1.1, 1.14

(56) References Cited

U.S. PATENT DOCUMENTS

| | | | |
|---|---|---|---|
| 5,129,049 A | 7/1992 | Cuzzo et al. | 358/1.14 |
| 5,479,587 A | 12/1995 | Campbell et al. | 358/1.17 |
| 5,483,622 A | 1/1996 | Zimmerman et al. | 358/1.15 |
| 5,524,186 A | 6/1996 | Campbell | 358/1.16 |
| 5,586,229 A | 12/1996 | Kim et al. | 358/1.17 |
| 5,602,976 A | 2/1997 | Cooper et al. | 358/1.17 |
| 6,040,917 A | 3/2000 | Campbell et al. | 358/1.17 |

FOREIGN PATENT DOCUMENTS

EP    0821319 A2    7/1997

OTHER PUBLICATIONS

Search Report (Application No: GB 9908833.8 dated Sep. 1, 1999).
Pending U.S. patent application PDNO: 10971109; Ser. No. 08/918,835; filed Aug. 26, 1997; Title: Reducing Memory Fragmentation by Coalescing and Redistributing Previously Distributed Page Strips.

Primary Examiner—Mark Wallerson
(74) Attorney, Agent, or Firm—Lane R. Simmons

(57) ABSTRACT

An imaging device and method enable the freeing of memory during a punt (print overrun) avoidance operation and during a duplexing operation for enhanced page throughput. Specifically, if a first race condition threshold is met, being indicative of an estimated need to pre-rasterize a band from a page of image data for punt avoidance, and if after pre-rasterization it is determined pre-rasterization is not actually needed for punt avoidance, then the pre-rasterized band is evaluated relative to its display list for memory savings purposes for improved page throughput performance. Similarly, if a duplex condition threshold is met, being indicative of a band being part of a first side of a duplex page being processed and of an estimated need to save memory for processing of the second side of the duplex page, then the band is pre-rasterized and evaluated relative to its display list for memory savings purposes for improved duplex page throughput performance. If neither the race condition threshold nor duplex condition threshold is met, but an increased general memory savings condition threshold is met for the band, then the band is pre-rasterized for memory savings purposes.

8 Claims, 3 Drawing Sheets

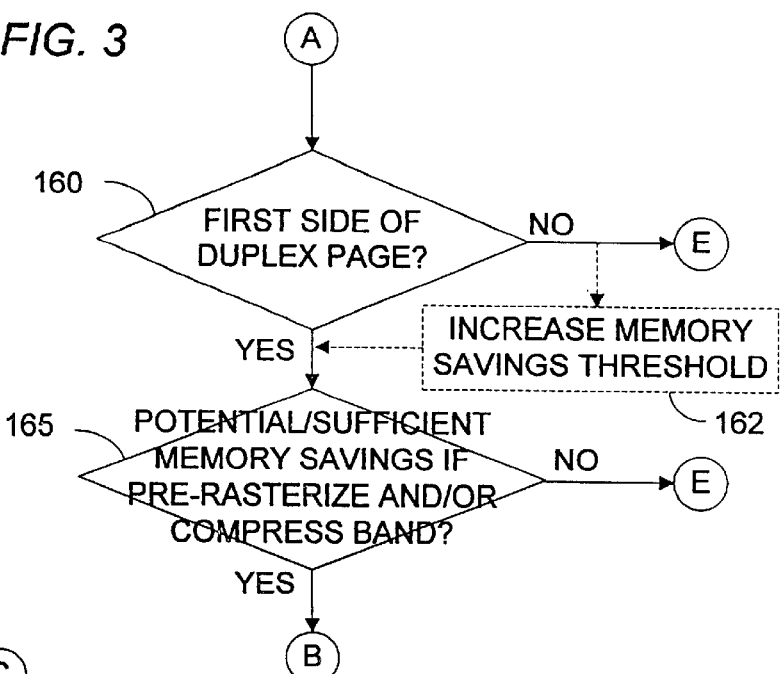
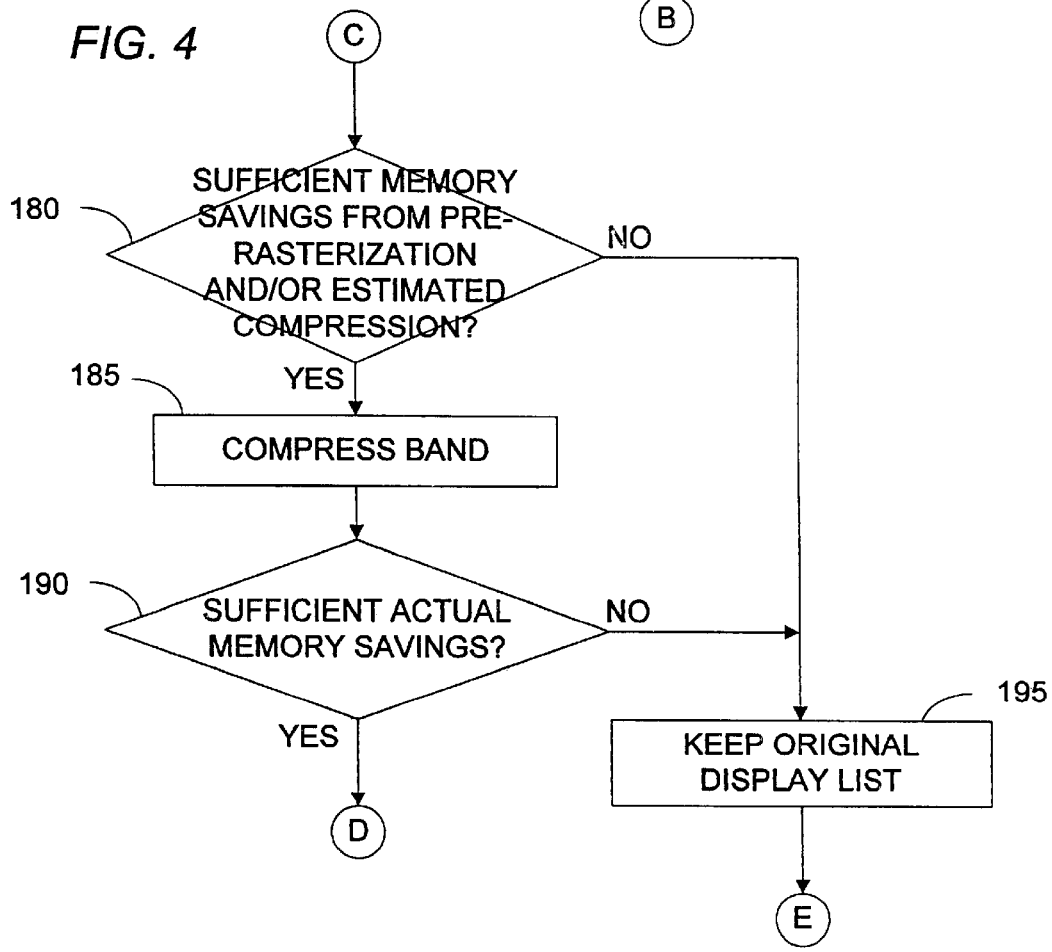

FREEING MEMORY IN A PAGE PRINTER DURING PUNT PROTECTION

This is a continuation of application Ser. No. 09/064,890 filed on Apr. 22, 1998 now U.S. Pat. No. 6,166,827.

FIELD OF THE INVENTION

This invention relates in general to image forming devices and, more particularly, to page printer memory management.

BACKGROUND OF THE INVENTION

In printers that employ laser engines as the "print mechanism", data must be provided at a speed that is fast enough to keep up with the print action (which can be measured by the rate of movement of the paper past the imaging drum). In such printers, formatting is either performed on the host computer, with large volumes of rasterized image data shipped to the printer at high speed, or on a formatter within the printer itself. Since a conventional laser printer engine operates at a constant speed, if rasterized image data is not available when a previous segment of image data has been imprinted, a "print overrun" or "punt" occurs and the page is not printable. In essence, the Image Processor that rasterizes the image data "races" the Output Video Task that images the data onto the imaging drum. This is commonly termed "racing the laser".

Several methods have been used in the prior art to avoid print overruns. First, a full raster bit map of an entire page may be stored in the printer so that the print mechanism always has rasterized data awaiting printing. However, this solution requires large amounts of random access memory (RAM) for each page. A second method for assuring the availability of print data to a laser printer is to construct a display list from the commands describing a page. During formatting, a page description received from a host is converted into a series of simple commands, called display commands, that describe what must be printed. The display commands are parsed and sorted according to their vertical position on the page. The page is then logically divided into sections called bands (or page strips), which bands are then individually rendered (i.e., the described objects in the bands are rendered) into a raster bit map and passed to the print engine for printing. This procedure enables lesser amounts of RAM to be used for the print image.

When the display commands are rendered at a fast enough pace, the same memory used to store a first band can be reused for a subsequent band further down the page. For example, in certain prior art printers it is known to employ three raster buffers for storing bands. During page processing, the first buffer is reused for a fourth band on the page, the second is reused for a fifth band, etc. However, under standard (generally maximum) page-per-minute performance, little time is left between finishing printing of a band and when a next band is required to be rasterized from the same print buffer.

Under certain circumstances, "complex" bands will include many display commands and require a longer than normal time for rasterization. Additionally, to rasterize a band (whether "complex" or not), more memory space may be required than is currently available—depending upon several factors associated with the printer, including memory size, memory fragmentation, job to be printed, and other printer system activities. In the case of a complex band, rasterization time may increase to such an extent that the succeeding band can not be delivered on time, thus causing a print overrun to occur. Accordingly, pre-rasterization is commonly performed on a complex band to ensure that the video imaging race with the laser will not cause a print overrun.

Racing the laser requires making a determination regarding how to get the best trade off between printer memory and real time processing requirements. In a properly working printer, a print overrun is avoided because the Image Processor task just manages to win every race with the direct memory access (DMA) video output task. It is undesirable to avoid print overruns by unilaterally pre-rasterizing every video band because (even with compression) that consumes too much precious printer memory for video DMA buffers. As such, one process has been developed to permit minimization of the number of pre-rasterized video buffers and is disclosed in U.S. Pat. No. 5,129,049 to Cuzzo et al., the disclosure of which is incorporated in full herein by reference. This was extended for compression and empirical Image Processor cost measurements in U.S. Pat. No. 5,479,587 to Campbell et al., also incorporated in full herein by reference.

In Campbell et aL, in the event of low available memory for processing print commands, each band of a page may be reevaluated and passed through several steps in attempt to reduce memory allocation requirements and free up more memory. For example, each band may be rasterized and compressed using one of several compression techniques. After a band is rasterized and compressed, the memory allocation requirement for that band is determined. If the memory allocation requirement is less than the memory allocation requirement of the display list for that same band (relative to a comparison threshold), then the rasterized and compressed version will be used and stored in memory rather than the display list. The rasterized and compressed band is stored in memory by being dissected into fragments (segments) and then linked and distributed into "holes" in the memory. The "holes" are, typically, smaller isolated free areas of memory surrounded by larger unavailable (used) areas. On the other hand, if the rasterized and compressed band's memory allocation requirement is not less than the memory allocation requirement for its display list (per the threshold), then the band may be processed again using a different compression technique. These steps of rasterizing a band, compressing it, comparing the size of the compressed version to the display list, and determining if the memory allocation requirement of the compressed version is less than that of the display list, may be repeated multiple times using differing compression techniques and/or thresholds until the band's allocation requirement is less than that of its display list.

Once all of the bands have been rasterized, compressed, evaluated and distributed (when the threshold was met) then processing of the print commands resumes at the point where the event of low available memory was previously detected (i.e., the point that initiated the reevaluation process for the page). The band that was previously attempting a memory allocation (but detected the low available memory event) should now have a better chance of being able to satisfy its memory allocation.

Distinguishing now from Campbell et al., U.S. Pat. No. 5,483,622 (Zimmerman et al.) discloses a Page Printer Having Automatic Font Compression and is also incorporated herein by reference in full. In Zimmerman et al., in the event of low available memory for processing print commands, alternative steps occur to alleviate the low memory error including: (i) compressing raster graphic images, and (ii) if no raster graphic images are present or if compression of the raster graphic images does not remove the low memory error, then compressing font characters. Additionally, a large size font whose size exceeds a threshold may automatically be compressed, regardless of a memory low/out signal being present.

Although these memory processing techniques often enable a memory allocation request to be satisfied, fragmentation of the memory may not be reduced. For example, fragmentation may not be reduced during band processing because each band is processed independently of all other bands. Namely, if a first band is rasterized, distributed and stored, and then some memory surrounding a distributed segment of that first band is subsequently deallocated, then the first band ends up actually causing fragmentation in the memory since it remains there even after its surrounding areas were deallocated. This scenario may occur, for example, if a segment of the first band was stored in a hole that was created by a second band's display list, and then the second band's display list was removed from around the first band in order to render the second band's rasterized and compressed band. Disadvantageously, if the memory becomes too fragmented (i.e., too many "holes" exist throughout the memory address space) such that other memory allocation requests cannot be satisfied that require contiguous allocations of memory, then overall page processing is crippled and a memory out error may result. U.S. patent application Ser. No. 08/918,835 further describes the dissecting of bands into holes in memory and further describes a method of reducing fragmentation and is incorporated herein by reference in full.

Due to memory fragmentation and the general contention for memory in a printer for processing print commands, in some cases the printing process has been known to undesirably "pause" when processing certain multi-page print jobs. When a pause occurs, it has been recognized that the printer is waiting for the allocation in memory of a band that is required for punt (print overrun) avoidance. The allocation may not occur for a number of reasons, including memory fragmentation and low free memory availability. Often, however, after the current pages that are in the print pipeline are printed (or flushed), sufficient memory becomes available so that the band allocation may generally be satisfied and, thus, conclude the "pause".

However, this potential "pausing" during a multi-page print job is not only undesirably but also frustrating to a user that expects a certain page-per-minute output as described by the page printer's specifications. Accordingly, an object of the present invention is to improve consistency of page throughput in a printer by improved memory management techniques.

SUMMARY OF THE INVENTION

According to principles of the present invention in a preferred embodiment, an imaging device and method enable the freeing of memory during a punt (print overrun) avoidance operation and during a duplexing operation for enhanced page throughput. Specifically, if a first race condition threshold is met, being indicative of an estimated need to pre-rasterize a band from a page of image data for punt avoidance, and if after pre-rasterization it is determined pre-rasterization is not actually needed for punt avoidance, then the pre-rasterized band is evaluated for memory savings purposes for improved page throughput performance. If the pre-rasterized band and/or a compressed version of the pre-rasterized band provides memory savings (per a threshold) relative to the band's display list, then the pre-rasterized and/or compressed band is kept and the display list is freed from memory. Otherwise, the display list is kept and the pre-rasterized band is released from memory.

According to further principles, if a duplex condition threshold is met for a band, being indicative of a band being part of a first side of a duplex page being processed and of an estimated need to save memory for processing of the second side of the duplex page, then the band is pre-rasterized and evaluated for memory savings purposes for improved duplex page throughput performance. If the pre-rasterized band and/or a compressed version of the pre-rasterized band provides memory savings (per a threshold) relative to the band's display list, then the pre-rasterized and/or compressed band is kept and the display list is freed from memory. Otherwise, the display list is kept and the pre-rasterized band is released from memory.

According to yet further principles, if neither the race condition threshold nor duplex condition threshold is met, but an increased general memory savings condition threshold is met for the band, then the band is pre-rasterized for memory savings purposes.

Other objects, advantages, and capabilities of the present invention will become more apparent as the description proceeds.

DESCRIPTION OF THE DRAWINGS

FIGS. 2–4 are flow charts depicting a preferred method of the present invention for freeing memory during punt protection processing and duplex processing of the printer of FIG. 1.

DETAILED DESCRIPTION OF THE INVENTION

Figure 1:
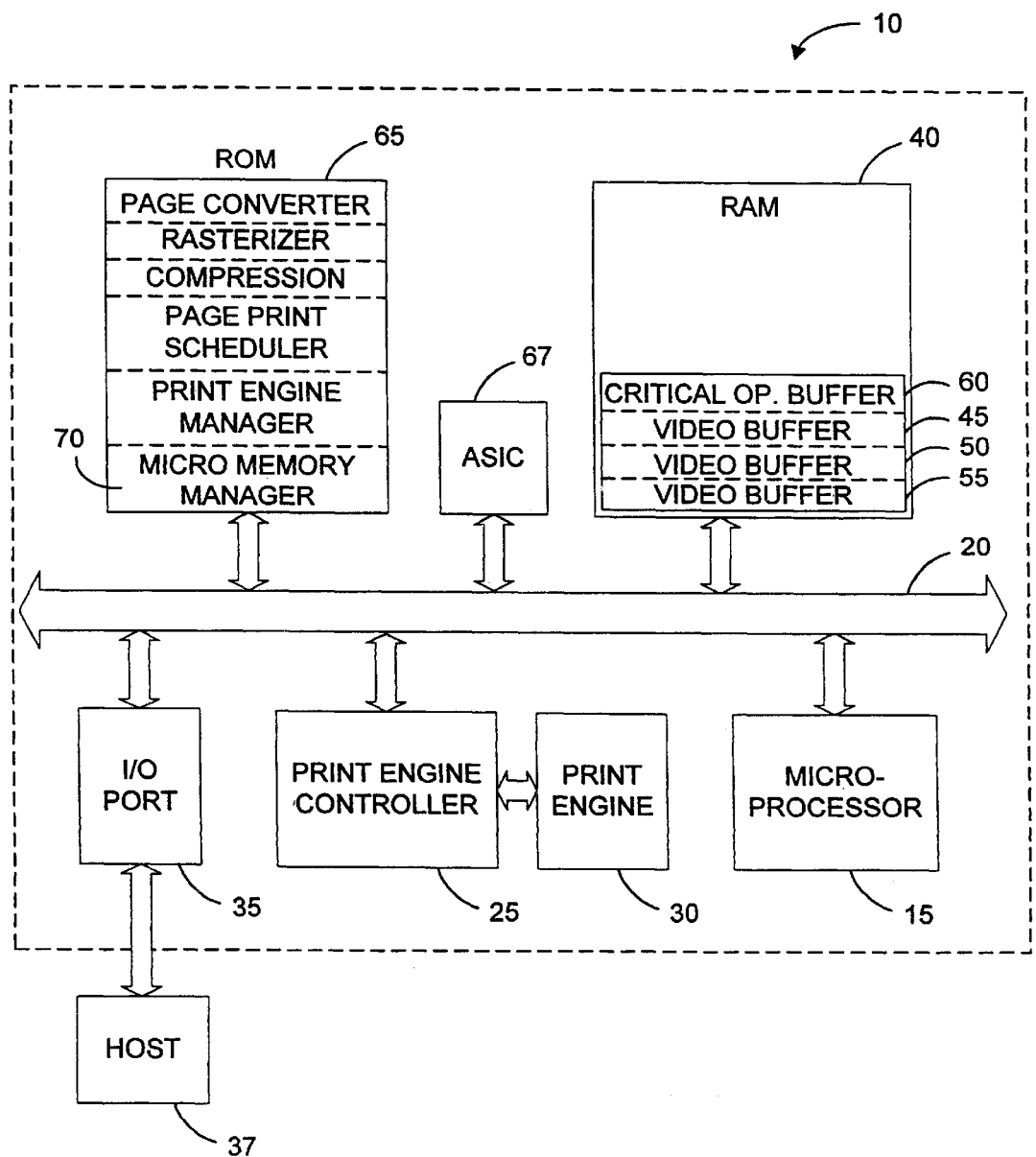
FIG. 1 is a block diagram of a laser printer embodying the present invention system and method for reducing pausing in a multi-page print job.

FIG. 1 is a high level block diagram of a page printer 10 incorporating the present invention system and method for improving memory management and thereby reducing printer pauses during a multi-page print job. Page printer 10 is controlled by a microprocessor 15 which communicates with other elements of the system via bus 20. A print engine controller 25 and associated print engine 30 connect to bus 20 and provide the print output capability for the page printer. Print engine 30 is preferably a laser printer that employs an electrophotographic drum imaging system as well known in the art. However, as will be obvious to those of ordinary skill in the art, the present invention is similarly applicable to other types of printers and/or imaging devices for improving consistency of page throughput, such as digital copiers, facsimile devices and the like.

An input/output (I/O) port 35 provides communications between page printer 10 and host computer 37, and receives page descriptions from the host for processing within page printer 10. A dynamic random access memory (RAM) 40 provides a main memory for the page printer. For purposes of discussion herein, RAM 40 is representative of a general purposes memory and/or a cache memory associated with processor 15, both as well known in the art. A first portion of RAM 40 includes three (in this example) pre-allocated (reserved) buffers 45, 50 and 55 (hereinafter 45–55) which are employed during band processing. These buffers may be video buffers (in a preferred embodiment) or some other pre-allocated buffers. During the print process, each pre-allocated video buffer receives a selected band's rasterized image data for storing and passing the same to print engine controller 25 and print engine 30. Only after one of the buffers 45, 50 or 55 becomes available (i.e., the band's rasterized data is transferred/imaged onto the drum), can a next band of rasterized data be inserted. During a multi-page (pipelined) print job, these video buffers are constantly in use and are used only for temporarily storing the rasterized image data prior to being output to the print engine. Although the pipeline of print data may be "flushed" out of the video buffers to free them up for other print processing needs, it is not generally desirable to do so because of the inevitable "pausing" that occurs in the printing process (whether in the middle of a current multi-page print job, or in between print jobs). In this context, "flushing" generally means waiting for sufficient memory 40 to be freed up to satisfy a particular allocation request, which may mean waiting for pages that are currently being processed to actually be printed.

A second portion of RAM 40 includes another pre-allocated (reserved) buffer 60. Buffer 60 is a critical operations buffer and is used for storing critical operation data for the express purpose of reducing printing pauses by the print engine which would potentially otherwise occur due to fragmentation of general memory area 40 and the general contention for memory therein during processing of print commands.

Preferably, critical operations buffer 60 is used to store data that requires a contiguous allocation of memory. For example, data stored in critical operations buffer 60 may include, selectively, pre-rasterized data, compressed data, pre-rasterized and compressed data, rendered character bitmaps, scaled raster objects, rotated raster objects, vector path data, or other data used for defragmenting memory 40. Additionally, the data is stored in buffer 60 only temporarily relative to band data stored and processed in general memory 40. Namely, it is temporary because the buffer is released for further use after completion of the critical operation (i.e., pre-rasterization, compression, etc.), but at least upon the close of a page being printed.

Advantageously, buffer 60 provides a reserved, contiguous area of memory for certain critical operations during page processing without, generally, having to wait for memory to be freed up in general memory 40 and without having to flush out video buffers 45–55 (i.e., without waiting for them to be flushed). The critical operations buffer is further described in U.S. patent application Ser. No. 08/958,437 and is incorporated herein by reference in full.

A read only memory (ROM) 65 holds firmware which controls the operation of microprocessor 15 and page printer 10. Although the firmware routines are discussed in reference to being stored in ROM 65, it is understood that their functionality may likewise be implemented in ASIC 67 if so desired. The routines (code procedures) stored in ROM 65 may include the following: a page converter, rasterizer, compression code, page print scheduler and print engine manager. The page converter firmware converts a page description received from the host to a display command list (wherein each display command defines an object to be printed on the page). The rasterizer firmware converts each display command to an appropriate bit map (rasterized band) and distributes the bit map into memory 40. The compression firmware compresses the rasterized bands or other data as necessary. Each of these routines may be conventional in the art.

Importantly, ROM 65 further includes a micro memory manager 70 according to the present invention. Micro memory manager 70 governs the memory management issues according to the present invention during punt protection processing, duplex printing, and other band evaluation processing for memory savings as will be described more fully herein.

When a page is closed for processing (i.e., all bands have been evaluated, rasterized, compressed, etc. for processing by print engine 30) then the rasterized bands are stored in one of the pre-allocated buffers 45–55 and subsequently passed to print engine 30 by print engine controller 25, thereby enabling the generation of an image (i.e., text/graphics etc). The page print scheduler controls the sequencing and transferring of band buffers to print engine controller 25. The print engine manager controls the operation of print engine controller 25 and, in turn, print engine 30.

Figure 2:
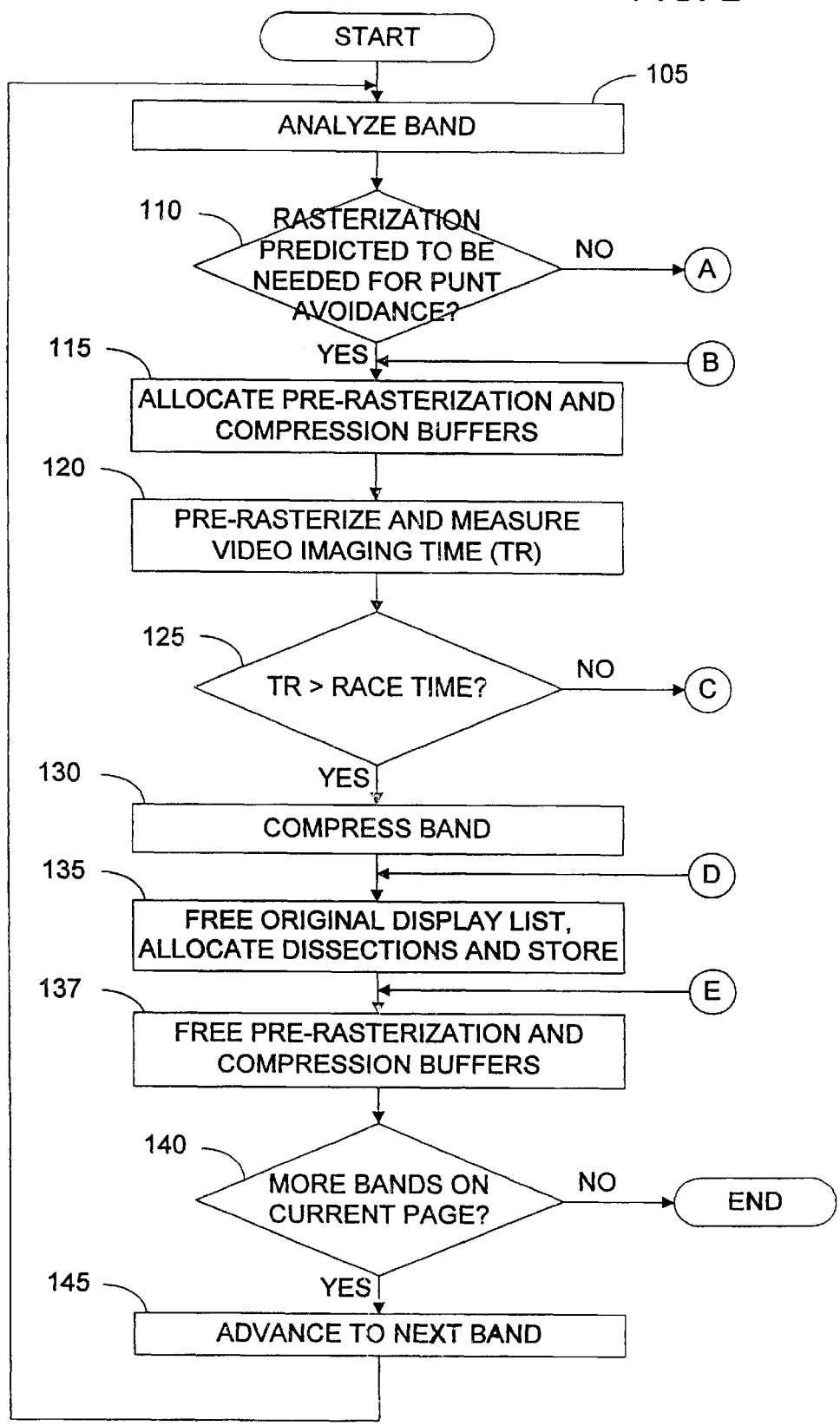

Referring now to FIGS. 2–4, these flow charts depict a preferred method of the present invention for freeing memory during punt protection processing and duplex processing of printer 10. Namely, after a current page has been composed into display lists and before the page is released to the printing page pipe, a punt avoidance process occurs. Conventionally, the main purpose of the punt avoidance processes was simply to assure that the page would not punt by pre-rasterizing certain bands. However, under principles of the present invention, an additional purpose is to use less memory for the current page to avoid multi-page job pauses.

Thus, in reference now to FIG. 2, a band (page strip) from a page of image data is analyzed 105 to determine whether pre-rasterization needs to occur for punt avoidance 110. This analysis may occur as conventional in the art (for example, see Cuzzo et al. and refer to the discussion herein regarding racing the laser). Simply put, this analysis is a calculated estimate of whether pre-rasterization should occur in order to avoid punting. If it is determined that pre-rasterization is needed 110 (i.e., if a first "race" condition threshold is met), then pre-rasterization and compression buffers are allocated 115, the band is pre-rasterized 120, and the empirical video imaging time (TR) is measured 120 (i.e., how long it actually took to rasterize the band). If the video imaging time (TR) is greater than the race time 125 (i.e., the race time being indicative of how much time is actually available to rasterize a band at the fixed image processing speed of printer 10), then we know that the original estimate for pre-rasterization 110 proved correct. In other words, there is a genuine need to pre-rasterize the band. Importantly, this check 125 (second race condition threshold) allows for compensation of the conservative cost estimates 110 (first race condition threshold) that are often used to predict the complexities of pre-rasterization. Thus, given the genuine need to pre-rasterize, the band is compressed 130, the original display list that is associated with this band is freed 135 from memory 40, the band is dissected and allocated (or the band's dissections are allocated) to holes in memory 40 and stored therein 135, and the pre-rasterization and compression buffers (that were used to pre-rasterize and compress the band 115) are released (freed) 137. These steps 125, 130, 135 and 137 are performed, for example, as described in Campbell et al. and U.S. patent application Ser. No. 08/918,835.

If there are more bands on the current page 140, image processing (or punt protection processing) advances to the next band 145 and analysis occurs again 105 as previously discussed. If there are no more bands 140, then the punt protection process is finished for the current page.

Under the present invention, there are two key processes that are implemented in connection with the punt protection process just described in reference to FIG. 2. These are memory saving processes that enable a more consistent page throughput for printer 10. A first process described hereafter relates to band pre-rasterization and compression for memory savings (relative to the band's display list) even though the band didn't need to be pre-rasterized to race the laser 125. FIGS. 2 and 4 describe this process. A second process described hereafter relates to band pre-rasterization and compression in the context of a first side of a page that is to be duplex printed for memory savings (relative to the band's display list) in anticipation of potentially encountering a low memory availability in processing the second side of the duplex page job. FIGS. 2, 3 and 4 describe this process. A third process, considered in connection with the first two processes, also provides additional memory savings during page processing. The third process relates to band pre-rasterization and compression when and if a third memory savings threshold is met and even though pre-rasterization didn't need to occur to race the laser or to duplex process. FIGS. 2, 3 and 4 also describe this process.

Thus, in reference now to the first memory saving process, if it is predicted that a band needs to be pre-rasterized to race the laser 110 (relative to a race condition threshold), and then the buffers are allocated 115 and the band is pre-rasterized 120, but if it is subsequently determined that the video imaging time to rasterize (TR) is not greater than the race time 125 (i.e., there really is not a need to pre-rasterize to race the laser), then the memory saving process flow continues as shown in reference to FIG. 4.

Accordingly, in reference now to FIG. 4, even though it was determined that the band really didn't need to be pre-rasterized (125, FIG. 2), since we have already invested in pre-rasterizing it 120, we check 180 to see if we can't gain some memory savings (relative to the display list associated with this band) either by keeping the pre-rasterized band as is, or by compressing it. In other words, a determination is made as to how much memory can be freed if the pre-rasterized band is kept and/or compressed even when the real time check 125 shows that pre-rasterization is not required for punt protection. Thus, 180, a preliminary analysis is done on the pre-rasterized band to estimate what the potential savings will be if the pre-rasterized band is kept and/or compressed relative to the size of the original display list for that band. This estimate/compression analysis is performed as conventional in the art. Namely, the actual size of the pre-rasterized band is compared to its display list, and/or compression ratios are checked relative to any available compression scheme(s). If indeed it appears memory would be saved 180 (relative to a first memory savings threshold associated with this analysis), then the pre-rasterized band is compressed 185. Then, upon further analysis 190, if sufficient actual compression savings occurred (relative to a second memory savings threshold), then the process flow continues such that this band's original display list is freed 135 (FIG. 2) from memory 40, and then the band's compressed dissections are allocated and stored 135 to holes in memory 40.

On the other hand, if it is determined that sufficient estimated or actual savings for this pre-rasterized and/or compressed band 180, 190 is not met (relative to the first and second memory savings thresholds respectively), then the original display list for this band is kept 195 in memory 40. Consequently, the process continues (FIG. 2) such that the pre-rasterization and compression buffers 137 are released for other use and then any further bands 140, 145 are also subsequently evaluated. Notably, the conditional paths described from flow box 180 and 190 to 195 enable a check system to ensure that memory use is really being minimized.

It should be noted here that a preferred embodiment includes an estimated compression savings check 180. However, this step is optional. In other words, compression 185 may occur without an estimate on compression savings 180. Then, upon actual determination of compression savings 190, appropriate steps may be taken to either keep the original display list 195 or to free the display list and keep the compressed band 135. This estimated compression savings check 180 is optional relative to memory savings during punt protection as described and also relative to memory savings during duplex processing and other general memory saving processing steps as will be discussed subsequently hereto.

In review of this first discussed memory usage minimization process during punt protection, this extension allows the printer to generate free memory in conditions where some may be found and when the free memory is likely needed to make or sustain a full page pipe. It consumes time for the compression and dissection steps, but the thresholds in the system are tuned so that the compression/dissection time spent is more than made up for by not pausing the page pipe. Additionally, since the investment has already been made to pre-rasterize the band, there is minimal cost but significant value to include the compression and dissection for improved memory savings.

In reference now to the second memory savings process of the present invention, if in fact pre-rasterization is not predicted to be needed for punt avoidance 110 (FIG. 2), then the steps in FIG. 3 and FIG. 4 help with the discussion. Specifically, the next step is to evaluate whether the current band is part of a first side of a page to be duplex printed 160. If the band is not part of a first side to be duplex printed, then no action is taken for this band and control returns to FIG. 2 for processing further bands 140, 145. However, if the current band is on a first side of a page that is to be duplex printed 160, then it is determined whether there is a potential and sufficient memory savings over this band's display list (relative to a given threshold, i.e., a duplexing condition threshold) if the band is pre-rasterized and/or compressed 165. If the threshold is not met, then no action is taken for this band and control returns again to FIG. 2 for processing further bands 140, 145.

On the other hand, if indeed the duplexing condition memory savings threshold is met 165, then pre-rasterization and compression buffers are allocated 115 (FIG. 2) and the band is pre-rasterized and the video imaging time is measured 120. Obviously, at this stage, the video imaging time (TR) is not greater than the race time 125 (as was previously determined at 110). Therefore, the next step is to perform a pre-rasterization and/or compression savings analysis 180 as previously discussed in reference to FIG. 4. If sufficient savings are estimated 180, then the band is compressed 185. Then, if sufficient actual compression savings occurred 190, the band's original display list is freed 135 (FIG. 2) from memory 40, the band's compressed dissections are stored 135 into memory 40, and the pre-rasterization and compression buffers are released 137. However, if it is determined that sufficient pre-rasterization and/or estimated or actual compression savings 180, 190 is not met, then the original display list for this band is kept 195 in memory 40, the pre-rasterization and compression buffers 137 are released for other use, and further band processing continues 140, 145.

It should be noted here that although the duplex processing evaluation steps 160 and 165 of FIG. 3 suggest a mutually exclusive analysis of the current band relative to the "race the laser" check 110 of FIG. 2, in a preferred embodiment these checks are accomplished (encoded) using a simple "IF/OR/THEN" type of evaluation. For example, IF rasterization is predicted to be needed 110 to race the laser, OR IF this is a first page of a duplex page 160 and there is a potential memory savings to be gained 165, THEN buffer allocation occurs 115 and pre-rasterization occurs 120. Additionally, if the duplex memory savings process is practiced separate from the punt protection race evaluation process, then the race comparison 125 is not needed in the duplex savings process analysis. Moreover, in the duplex memory savings process, the savings analysis (threshold) at 180 is also optional.

In addition to the described punt protection processing evaluation 110 and duplex processing evaluation 160, a preferred embodiment of the present invention further includes a general analysis of the current band relative to potential memory savings over its display list. Namely, FIG. 3 shows a dashed line originating from the "No" result of box 160 which directs the flow control to box 165 through a memory savings threshold adjustment 162. This dashed line indicates, optionally, that even if the band does not need to be pre-rasterized to race the laser, and even if the band is not on a first side of a duplex page, then we'll analyze it anyway 165 (with an adjusted threshold 162, discussed later) to determine if we can gain some memory savings by pre-rasterizing and/or compressing it 165. In this context, the overall flow analysis is implemented, for example, as follows: IF rasterization is predicted to be needed 110 to race the laser, OR IF this is a first page of a duplex page 160 and there is a potential memory savings to be gained 165, OR IF there is a potential memory savings to be gained 165 regardless of no race condition and no duplex condition, THEN buffer allocation occurs 115 and pre-rasterization occurs 120.

It should also be noted here (in reference to FIGS. 2–4) that each of the thresholds 110, 162, 165, 180 and 190 are established by design choice, given considerations such as how much memory 40 is in printer 10, and how much resource usage has already been invested into the current band. For example, in a preferred embodiment, the threshold analysis for pre-rasterizing a band 110, 165 is greater than the threshold for evaluating/estimating whether sufficient compression savings might be attained 180, which is greater than the threshold for evaluating whether sufficient pre-rasterization and/or compression savings is actually attained 190. This is due to the fact that once the band is pre-rasterized 120, there is an inclination to utilize the pre-rasterized band if possible since we have already invested system resources into the pre-rasterization process. Thus, if it looks like memory can be saved 180 by keeping the already pre-rasterized band instead of its display list, then we'll take advantage of that with a lesser threshold. Similarly, if compression has already occurred 185, then the threshold will even be less for determining whether sufficient actual compression savings has occurred 190.

Conversely, the threshold for pre-rasterizing the band based on a race condition 110 is less than the threshold for pre-rasterizing based on a duplexing condition 160 which is less than the threshold 162 for pre-rasterizing based on simply a general memory savings in the event no race condition or duplexing condition is met. In other words, a higher threshold is set to pre-rasterize based simply on a general memory savings 162, 165 due to the cost of pre-rasterization. Overall, each of these thresholds is established based on each condition's relative importance for overall page throughput.

In review now of this second discussed memory usage minimization process relative to duplexing, it should also be noted that in Campbell et aL., the compression of raster patches and bands on the page being composed was done as a last resort to avoid a memory out. However, this occurred after the page pipe had been flushed (i.e., due to a printing "pause" occurring). In that context, during duplex printing, raster graphics patches were compressed on the first side (of a duplex page) to maximize the amount of memory available for the second side, to avoid some memory out conditions on the second side and, consequently, to help keep the page pipe full. However, bands were not analyzed for memory savings on the first side of a duplex page. Thus, the present invention maximizes available memory and page throughput by evaluating compression savings relative to a full band in the context of duplex printing.

The present invention memory savings in a duplex analysis is important because over consumption of memory on the first side of a duplex page can starve the second side for memory, resulting in either a slow down or a memory out. Because the page sides print on the same piece of paper, the printer cannot recover memory the usual way, i.e., by waiting for printing. Additionally, just printing the first side processed is not a general solution since some printers print the second side processed first.

Thus, under the present invention, when a sufficiently large critical operations block 60 (or some other similar memory) is available, a practical solution is provided to the duplex printing problem without having to flush the pipe. Using this technique, the printer tends to run faster in duplex printing and tends to have fewer memory outs on the second side process of a duplex job.

Finally, it should also be noted that in a preferred embodiment, both of the present invention memory utilization techniques are employed together in order to enable a best memory management tool and provide a best consistency of printing (pauseless printing) in a multi-page job. However, it will be understood that either of these memory utilization techniques may be practiced separately from the other.

In summary, the present invention provides tools for enhanced memory management for improved page throughput in an imaging device such as a laser printer. Furthermore, it will be obvious to one of ordinary skill in the art that the present invention is easily implemented utilizing any of a variety of components and tools existing in the art. Moreover, while the present invention has been described by reference to specific embodiments, it will be apparent that other alternative embodiments and methods of implementation or modification may be employed without departing from the true spirit and scope of the invention.

What is claimed is:

1. A computer-readable medium having computer-executable instructions for performing steps including:
   (a) detecting first indicia indicative of a first race condition threshold being met for a band from a page of image data;
   (b) responsive to the first indicia, pre-rasterizing the band to form a pre-rasterized band;
   (c) responsive to the pre-rasterizing, detecting second indicia indicative of the pre-rasterizing not being required to enable normal completion of image processing for the band; and,
   (d) responsive to the second indicia, comparing an estimated memory consumption of an estimated compressed form of the pre-rasterized band with a memory consumption of a display list associated with the pre-rasterized band, and keeping one of the pre-rasterized band and the display list, whichever consumes less memory, and freeing the other.

2. A method of image processing, comprising:
   (a) pre-rasterizing a band from a page of image data to form a pre-rasterized band;
   (b) responsive to the pre-rasterizing, detecting indicia indicative of the pre-rasterizing not being required to enable normal completion of image processing for the image data by an imaging device;
   (c) responsive to detecting the indicia, comparing a memory consumption of the pre-rasterized band with a memory consumption of a display list associated with the pre-rasterized band; and,
   (d) responsive to the comparing, keeping one of the pre-rasterized band and the display list, and freeing the other, dependent upon a memory consumption evaluation.

3. A method of image processing, comprising:
   (a) pre-rasterizing a band from a page of image data to form a pre-rasterized band;
   (b) responsive to the pre-rasterizing, detecting indicia indicative of the pre-rasterizing not being required to enable normal completion of image processing for the image data by an imaging device;
   (c) responsive to detecting the indicia, comparing an estimated memory consumption of an estimated compressed form of the pre-rasterized band with a memory consumption of a display list associated with the pre-rasterized band; and,
   (d) responsive to the comparing, keeping one of the pre-rasterized band and the display list, and freeing the other, dependent upon a memory consumption evaluation.

4. A method of image processing, comprising:
   (a) pre-rasterizing a band from a page of image data to form a pre-rasterized band;
   (b) responsive to the pre-rasterizing, detecting indicia indicative of the pre-rasterizing not being required to enable normal completion of image processing for the image data by an imaging device;
   (c) responsive to detecting the indicia, compressing the pre-rasterized band and comparing a memory consumption of a compressed form of the pre-rasterized band with a memory consumption of a display list associated with the pre-rasterized band; and,
   (d) responsive to the comparing, keeping one of the compressed form of the pre-rasterized band and the display list, and freeing the other, dependent upon a memory consumption evaluation.

5. An imaging device comprising:
   (a) a print engine coupled to a memory; and,
   (b) computing apparatus coupled to the memory, the computing apparatus configured to:
      (i) pre-rasterize a band from a page of image data to form a pre-rasterized band;
      (ii) detect indicia indicative of the pre-rasterized band not needing to be pre-rasterized to enable normal completion of image processing for the image data by the imaging device;
      (iii) compare a memory consumption of the pre-rasterized band with a memory consumption of a display list associated with the pre-rasterized band; and,
      (iv) keep one of the pre-rasterized band and the display list, and free the other, dependent upon a memory consumption evaluation.

6. An imaging device comprising:
   (a) a print engine coupled to a memory; and,
   (b) computing apparatus coupled to the memory, the computing apparatus configured to:
      (i) pre-rasterize a band from a page of image data to form a pre-rasterized band;
      (ii) detect indicia indicative of the pre-rasterized band not needing to be pre-rasterized to enable normal completion of image processing for the image data by the imaging device;
      (iii) compare an estimated memory consumption of an estimated compressed form of the pre-rasterized band with a memory consumption of a display list associated with the pre-rasterized band; and,
      (iv) keep one of the estimated compressed form of the pre-rasterized band and the display list, and free the other, dependent upon a memory consumption evaluation.

7. An imaging device comprising computing apparatus configured to:
   (a) a print engine coupled to a memory; and,
   (b) computing apparatus coupled to the memory and configured to:
      (i) pre-rasterize a band from a page of image data to form a pre-rasterized band;
      (ii) detect indicia indicative of the pre-rasterized band not needing to have been pre-rasterized to enable normal completion of image processing for the image data by the imaging device;
      (iii) compare a memory consumption of a compressed form of the pre-rasterized band with a memory consumption of a display list associated with the pre-rasterized band; and,
      (iv) keep one of the compressed form of the pre-rasterized band and the display list, and free the other, dependent upon a memory consumption evaluation.

8. A computer-readable medium having computer-executable instructions configured for performing the following:
   (a) detecting first indicia indicative of a first race condition threshold being met for a band from a page of image data;
   (b) responsive to the first indicia, pre-rasterizing the band to form a pre-rasterized band;
   (c) responsive to the pre-rasterizing, detecting second indicia indicative of the pre-rasterizing not being required to enable normal completion of image processing for the band; and,
   (d) responsive to the second indicia, compressing the pre-rasterized band and comparing a memory consumption of a compressed form of the pre-rasterized band with a memory consumption of a display list associated with the pre-rasterized band, and keeping one of the compressed form of the pre-rasterized band and the display list, whichever consumes less memory, and freeing the other.

* * * * *